Patented July 5, 1927.

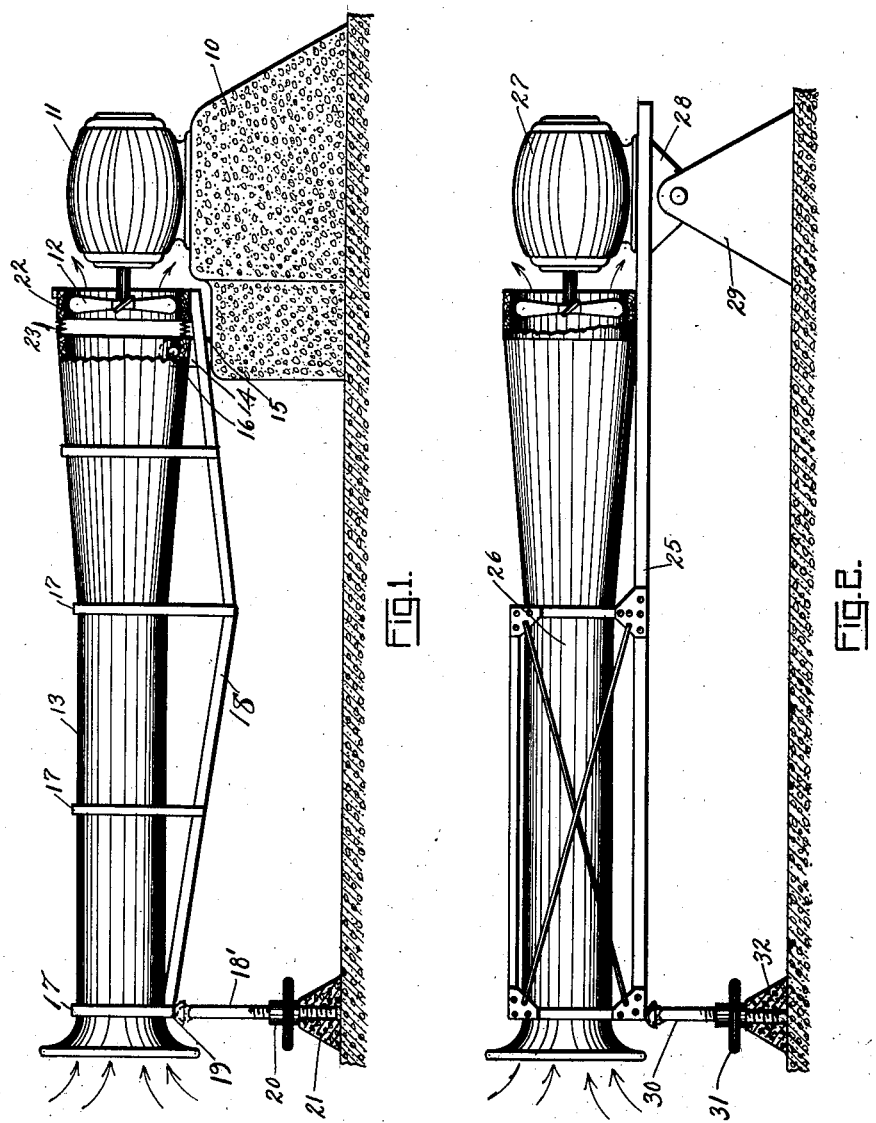

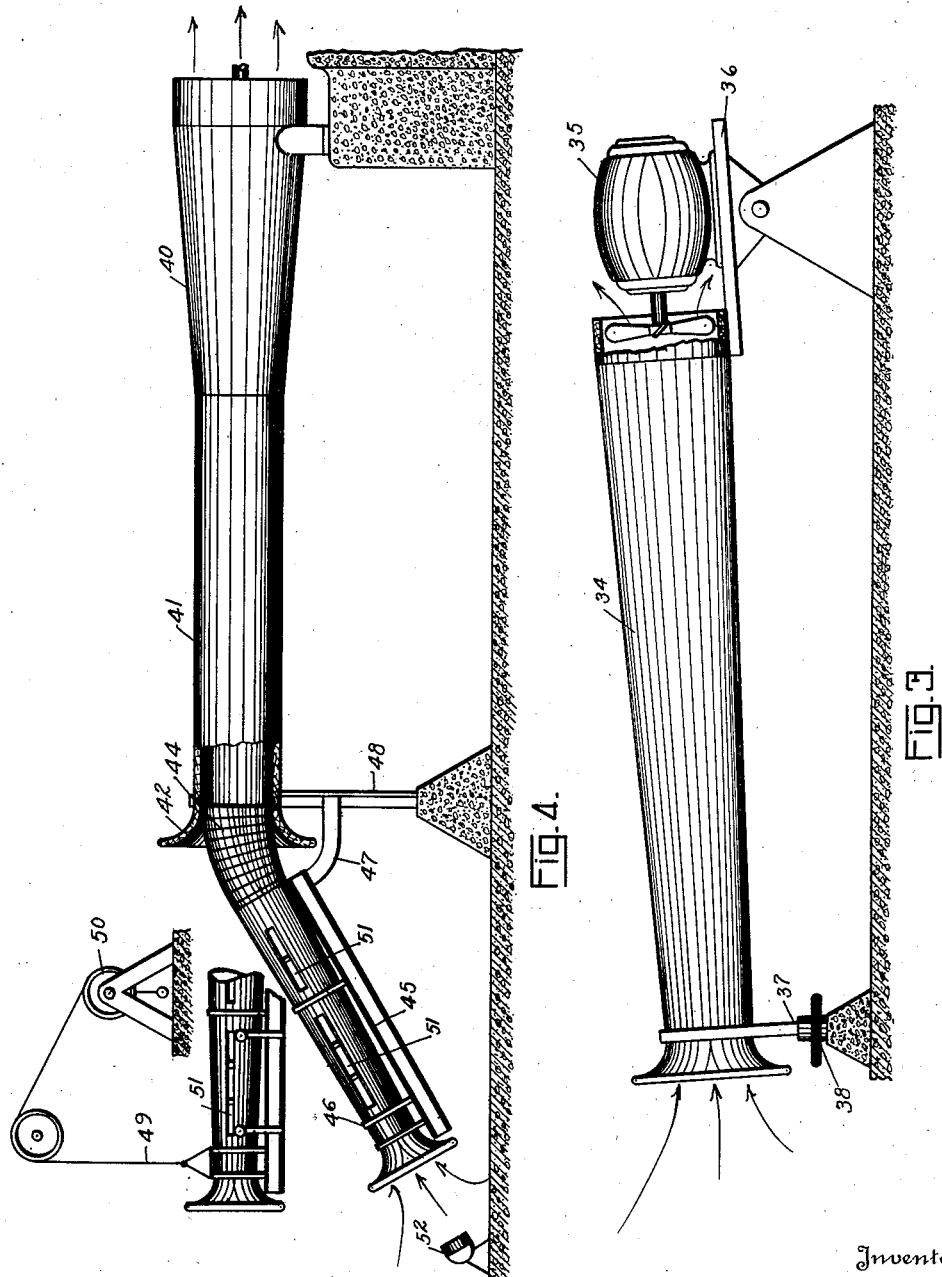

1,635,038

UNITED STATES PATENT OFFICE.

ELISHA N. FALES, OF DAYTON, OHIO.

WIND TUNNEL FOR FLIGHT OF MODELS.

Application filed April 18, 1922. Serial No. 555,366.

This invention relates to improvements in wind tunnels whereby the free flight of airplane models may be obtained therein and the flight characteristics of the models observed.

If a model of an airplane is built to scale and properly balanced it should be able to glide in a manner analogous to the full size machine. A current of air directed upwardly at the gliding angle should support the model at a fixed point so that its properties may be observed. The behavior of the model under these circumstances is similar to the case of soaring birds which naturally choose a place where the wind has an upward flow and then adjust their wings to a gliding angle, such that in calm air they would glide downward in a direction and at a speed equal and contrary to the upwardly inclined air current. The result is that the soaring bird may remain motionless in space. The speed of the air in the wind tunnel thus inclined may be varied until the model is just supported; or the wind tunnel may be so formed that the velocity differs along its length. In the latter case the airplane will move one way or the other until the air velocity is just sufficient to support its weight, and the position of the model in the tunnel will afford a measure of the coefficient of lift, because the weight of the model is known as well as the air velocity at the point in question.

In order to produce the conditions above described a wind tunnel or a portion thereof, according to my invention, is pivoted on a horizontal axis in such manner that the air current may be caused to flow upwardly at any suitable angle.

The invention is hereinafter described in connection with the accompanying drawings, in which:—

Figure 1 is a side elevation of one embodiment of the invention.

Figure 2 is a side elevation of a modified form thereof.

Figure 3 is a side elevation of the invention as applied to a conical tunnel.

Figure 4 is a side elevation of a wind tunnel having a pivoted portion in which free flight may take place.

In Figure 1, the number 10 designates a base supporting the motor 11 which drives the fan 12 located at one end of a wind tunnel 13. The latter is provided with a yoke 14 which is pivotally connected to a bracket 15, mounted on the base 10, by means of a pin 16. Metallic bands 17 embracing the wind tunnel are connected to truss rods 18 which strengthen and support the wind tunnel throughout its length. The forward end of the truss rods are attached to the forward band 17 and connected to an elevating screw 18' by means of a ball and socket joint 19. The screw 18' passes through a nut 20 into a casing 21 which may rest upon the floor. The fan 12 is located within a casing 22 attached to the base 10 and connected to the wind tunnel by a flexible sleeve 23.

It is necessary to adjust both the angularity of the wind tunnel and the air velocity, since in a tunnel with parallel walls the position of the model along the tunnel axis does not determine the velocity as is the case in a conical tunnel.

To adjust the angularity of the wind tunnel the nut 20 is turned to raise or lower the wind tunnel about the pivot pin 16. The air speed in the tunnel may be adjusted by varying the speed of the motor 11.

In Figure 2 a frame 25 supports a cylindrical wind tunnel 26 and the fan motor 27. The frame is provided near one end with lugs 28 which are pivotally mounted in the yoke shaped upper end of a base or pedestal 29. An elevating screw 30 engaging a nut 31 is connected to the frame 25 by a ball and socket joint. The lower end of the elevating screw 30 is received within a casing 32. During the angular adjustment of the wind tunnel the motor 27 moves therewith so that the fan may be mounted directly within the main body of the wind tunnel, as shown.

In Figure 3 a conical wind tunnel 34 and a fan motor 35 are mounted on a frame 36 similar to the frame 25 of Figure 2. An elevating screw and nut 37, 38 are also connected to the forward end of the wind tunnel and frame as described in connection with Figures 1 and 2. The air velocity in this wind tunnel will vary along the length thereof owing to the graduated expansion of the sectional area of the cone. The airplane model will adjust its position along the conical wind tunnel until the air velocity at a section is just sufficient to support its weight.

In Figure 4 a wind tunnel 40, having an experimental chamber 41 and bell mouth 42 is associated with an auxiliary portion or wind tunnel in which free flight may be obtained. The auxiliary portion 43 is provided with a flexible end 44 which is adapted to fit tightly within the chamber or throat 41. Beams 45 support the auxiliary wind tunnel by means of spaced bands 46 embracing the body thereof and attached to the beams. The beams 45 are pivotally connected at one end to a bracket 47 attached to a vertical framework 48. The cable 49 of a hoist or windlass 50 is connected to the forward end of the auxiliary wind tunnel for the purpose of changing the angular position thereof. A motor driven fan or propeller (not shown) exhausts the air from the main wind tunnel in a well known manner and causes a flow through the tiltable portion 43. The sides of the latter diverge toward the fan at a small angle so that the air flow always fills this conical passageway. Glass doors or windows 51 placed in the sides of the auxiliary tunnel permit observation of the interior of the tunnel and access thereto. A light 52 brilliantly illuminates the throat and interior of the auxiliary wind tunnel.

The small model of an airplane is introduced into the wind tunnel portion 43, and the angle of the tunnel, air velocity therein, and the balance of the model are varied until free flight is successfully attained. In a conical wind tunnel the proper velocity is automatically sought by the model which will travel down-stream or up-stream to seek the velocity corresponding to its angle of incidence, thereby taking care of one of the variable factors recited above. The study of the flight of free flying models becomes, as a result of this invention, a laboratory proposition offering valuable information to the aircraft designer.

I claim:—

1. In combination a pivoted wind tunnel for the aerodynamic testing of freely suspended aerial models, and means for adjusting the angular position thereof.

2. In combination a pivoted wind tunnel for the aerodynamic testing of freely suspended aerial models, having a variable speed fan adapted to vary the air velocity therein, and means for adjusting the angular position of the wind tunnel so as to direct the air flow upwardly.

3. The combination with a wind tunnel for the aerodynamic testing of freely suspended aerial models, of means for changing the angular position thereof to direct the air flow upwardly at the proper angle to obtain the free flight of airplane models therein.

4. The combination with a conical wind tunnel for the aerodynamic testing of freely suspended aerial models, of means for changing the angular position thereof to direct the air flow upwardly at such an angle that the airplane model when placed therein is sustained in free flight at a section of said tunnel having the proper air velocity.

5. The combination with a wind tunnel for the aerodynamic testing of freely suspended aerial models, having an auxiliary portion in pivoted relation thereto, flexible devices therebetween connecting the channels thereof in continuous relation, and means for adjusting the angular relation between said wind tunnel and auxiliary portion.

6. In combination with a conical wind tunnel for aerodynamic testing of aerial models, means for inducing an air current therethrough, means for changing the angular position of said wind tunnel to direct the air flow upwardly at such an angle that the airplane model therein is sustained in free flight at a section of the wind tunnel having the proper air velocity and direction.

7. In combination in a device for aerodynamic testing of aerial models, a wind tunnel, an exhauster fan, said wind tunnel having a substantially conical inner bore with its larger diameter toward said exhauster fan.

8. In combination in a device for aerodynamic testing of aerial models, a wind tunnel, an exhauster fan, said wind tunnel having a substantially conical inner bore with its larger diameter toward said exhauster fan, and means for angularly adjusting said wind tunnel.

9. In combination in a device for aerodynamic testing of aerial models, a wind tunnel, an exhauster fan, said wind tunnel having a substantially conical inner bore with its larger diameter toward said exhauster fan, means for angularly adjusting said wind tunnel, and observation windows through the sides of said wind tunnel.

10. In combination in a device for aerodynamic testing of aerial models, a wind tunnel, an exhauster fan, said wind tunnel having a substantially conical inner bore with its larger diameter toward said exhauster fan, inlet end of said wind tunnel being flared to prevent formation of eddies in the air currents entering said tunnel.

In testimony whereof I affix my signature.

ELISHA N. FALES.